April 18, 1961  W. R. STUDHALTER ET AL  2,979,897
ULLAGE COMPENSATORS FOR PRESSURIZING SYSTEMS
Filed April 26, 1954

INVENTORS.
WALTER R. STUDHALTER
LOWELL M. MILLER
WELDON O. BERGREEN
BY William R. Lane
ATTORNEY

United States Patent Office 2,979,897
Patented Apr. 18, 1961

2,979,897

ULLAGE COMPENSATORS FOR PRESSURIZING SYSTEMS

Walter R. Studhalter, Anaheim, Lowell M. Miller, Lakewood, and Weldon O. Bergreen, Altadena, Calif., assignors to North American Aviation, Inc.

Filed Apr. 26, 1954, Ser. No. 425,598

7 Claims. (Cl. 60—39.48)

This invention is directed to various forms of ullage compensators for use in pressurizing systems. The word "ullage" is used to describe the free space above the surface of the liquid contained in a tank.

A particular problem arises in obtaining rapid delivery of any liquid in a tank by pressurization when an empty space is present in the tank. This problem is particularly acute when the tank must be pressurized rapidly at various temperatures. When such tank of fixed volume and loaded with a fixed weight of liquid is subjected to operating conditions over various temperature ranges, the liquid within the tank contracts and expands as the temperature decreases or increases, thus giving various amounts of ullage in the tank.

In order to rapidly increase delivery pressure to a predetermined value, it is desired that all, or the major part, of the pressurizing medium act directly on the liquid. If it is necessary that the pressurizing medium first act to pressurize the ullage, it is impossible to rapidly increase the delivery pressure to a predetermined value.

This problem is particularly important in the designing of liquid propellant rocket power plants in which propellants are supplied by a pressurized feed system as distinguished from a system in which the propellants are pumped to the combustion chamber. It is necessary that the propellent tanks be rapidly pressurized at the start of the firing sequence. The volume of propellant being expelled from the tanks opens burst diaphragms or other normally closed valves and almost instantly initiates combustion. All of this preliminary pressurization must be accomplished rapidly over a wide range of temperatures. These temperatures will normally vary from —65° F. to 160° F. Use of the instant invention is contemplated at temperatures both within and without this range. The previous methods and apparatus utilized in tank pressurization do not allow for pressurization at the rapidity contemplated by the instant invention. The variation in tank volume of certain propellants over a temperature range of —65° F. to 160° F. becomes an extremely significant factor when it is realized that expansion space has to be provided in the storage system since propellant containers must be confined volumes. As a rule, the storage systems or propellent containers contain one of many oxidizers and one of many fuels. Spill-over of oxidizers and loss of any propellant cannot be permitted. As an example of this problem, a propellant with a residual temperature of —65° F. completely contained in a tank at some definite pressure will expand as its temperature is raised to 160° F. Approximately twenty percent more volume will have to be provided in an ullage or similar space for the increased volume in order to permit expansion of the liquid in the storage system. In the field of ballistic rocketry, for example, it is necessary that a stated ratio of oxidizer and fuel flow be delivered at a prescribed pressure and during a certain small time interval to the combustion chamber in order to obtain constant rocket performance measured as the time to a 1,000 yard target. With former pressurizing methods the variable and increased time, due to the variable ullage space, required to pressurize each propellant up to the operating value is of sufficient magnitude to preclude meeting the operating requirements. The delay ensued by having to pressurize a large ullage volume may lead to malfunction of the rocket and to uneven pressurization. In addition, certain rocket engines have less than rated propellant volume during operation on cold days because of the variable ullage condition, and consequently produce less than rated thrust. Such lowered thrust will be of a longer duration, however, and will not appreciably affect the total impulse of the rocket.

The primary object of this invention is to provide means to obtain rapid pressurization of a fluid in a tank.

A further object of this invention is to provide means to obtain rapid pressurization of the fluid in a propellant tank by isolating the ullage contained in the system and thus permit the operation under any attitude condition of the tank.

A particular object of this invention is to provide an ullage compensating system in which the medium within the ullage system is prevented from coming in direct contact with the propellant.

A further object of this invention is to provide a flexible ullage container within or without the propellant tank to compensate for the change in volume of the propellant due to temperature differences.

A still further object of this invention is to provide a means of eliminating vaporization of the propellant in the main tank and the ullage tank.

An object of this invention is to provide an ullage system which will force the expanded volume of propellant back into the main propellent feed system in order to increase the main flow to the power plant.

A further object of this invention is to provide a rocket having an ullage compensating system which enables the rocket to efficiently operate under all standard ambient conditions of temperature and attitude.

A still further object of this invention is to provide an ullage compensating system which acts through the medium of an inert confined fluid.

A still further object of this invention is to provide, in an ullage compensating system, a means for removing all trapped air and vapors from one or more propellent containers while the containers are being filled with predetermined quantities of propellants.

An additional object of this invention is to incorporate various ullage compensating devices in rocket structure.

Other objects of invention will become apparent from the following description taken in connection with the accompanying drawings, in which—

Figure 1:
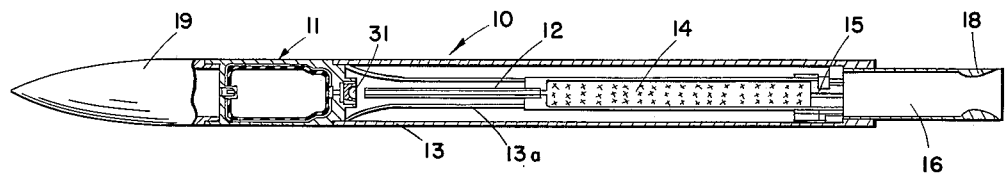
Fig. 1 is a cross section of a rocket combining the present invention in its specific aspects.

The invention in its overall aspects is illustrated in Fig. 1. Fig. 1 shows a cross-sectional view of a rocket in which an ullage compensator is incorporated. The rocket 10 comprises a warhead 19, an ullage compensating device 11, an exhaust tube 12, propellant tank 13 which in the illustrated rocket contains two distinct sections separated by a flexible wall 13a, an igniter and pressurizing grain 14, a fuel and oxidizer injector 15, a combustion chamber 16, and a throat and exhaust section 18.

Figure 2:
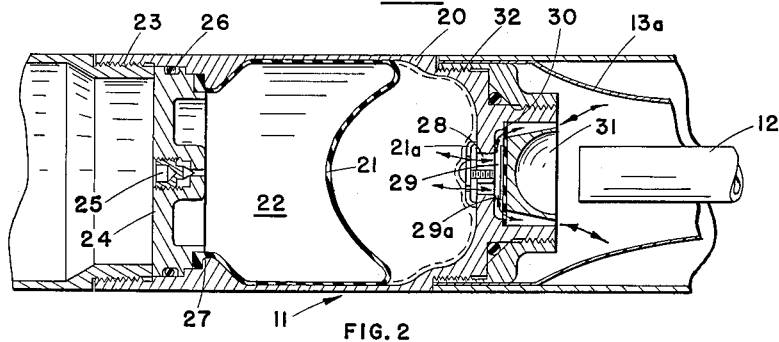
Fig. 2 shows a detailed cross section of the ullage compensating device of Fig. 1.

In operation, the rocket 10 contains, for example, fuel in the inner portion of the propellent tank surrounding the exhaust tube 12, while oxidizer is stored between the exterior rigid wall of the rocket and the flexible wall 13a. In storage the expansion and contraction of the fuel and oxidizer is compensated for by the presence of the ullage system 11. This ullage system is explained below with reference to Fig. 2. When the igniter 14 is fired, hot gases instantly or rapidly pressurize the propellent tanks by reason of the gases traveling along the exhaust tube 12 and being deflected by the deflector 31. Since any ullage present in the propellent tanks is isolated in the ullage compartment 11, the exhaust gases rapidly pressurize the propellent tank and force the fuel and the oxidizer, the latter through the action of the flexible walls, out towards the injector. The hot gases from the igniter are also emitted in the opposite direction from the exhaust tube and create the necessary ignition for the injected fuel and oxidizer in this combustion chamber. The hot gases in the combustion chamber pass through the venturi and exhaust section 18 to give the necessary thrust to the overall rocket.

The ullage compensating assembly 11 comprises a cylindrical wall member 20 having warhead attaching means 23 on one end thereof. The opposite end of the cylindrical member 20 has means 32 to attach the ullage assembly to the propellent tanks. A flexible bag 21 is anchored within the cylindrical member 20 by a clamping end piece 24 and an interior ridge 27 on the cylindrical member 20. The end piece 24 is sealed with a rubber sealing ring 26 and contains a filling port and closure plug 25. The flexible bag 21 is capable of taking a shape corresponding to the interior of cylindrical member 20 (shown in dotted lines in Fig. 2). At the end of the ullage compartment, as illustrated, there is a bleed opening or orifice 28. Within this bleed opening is a flapper valve 29 which in the pre-fire condition is in the open position. Means 21a is provided within the ullage compartment to prevent pinch-off of the bag 21 against passage 28. Wires or similar devices may be employed for this purpose. A deflector 31 is attached to the aft end of the member 20 by a flexible diaphragm 30. When the gas from the igniter passes through the exhaust tube 12 and hits the deflector 31 the rear end of the deflector 31 will seat against the portions 29a to effectively close the bleed opening 28. Thus, during the fire cycle the ullage compartment is closed. During pre-firing, the bleed passage 28 is in the open position and accommodates gradual flow of propellant from the propellent tanks. This gradual flow is caused by gradual changes in volume of the propellant resulting from changes in the ambient temperature. The expandible bag in the ullage unit expands and contracts accordingly, always preventing vaporization of the propellant by keeping more than vapor pressure acting on the propellant. It is to be understood that various sealing means may be used to anchor the flexible bag 21 within the ullage unit and that various valve means may be operated in the bleed passageway to accomplish the same purpose as the valve 29.

It is necessary that air and other vapors be removed from the ullage unit, the propellent tanks and the entire fluid system. This may be accomplished by loading measured quantities of each propellant in their respective sections of the propellent tank and providing a suitable vapor vent at the high point of each tank section and adjacent the ullage unit. A measured quantity of Freon 22 or other suitable compressible medium (calibrated for the particular ambient conditions at the site and time of loading) is loaded into the closed volume 22 within the ullage bag 21. The vapor pressure of the Freon or any other suitable gas such as air is greater than the pressure upon the propellants in the propellent tank.

Any propellant which has flowed through the bleed passageway 28 into the space between the ullage bag and the shell member 20, containing the bag, is trapped within that space upon the sudden pressurization of the propellent tanks by reason of the deflector 31 seating on the portion 29a to effectively close the passageway 28. It has been found that the slight change in fuel/oxidizer ratio, due to the entrapment of either the fuel or oxidizer, is not detrimental to the performance of the rocket.

Figures 3, 5, 6:
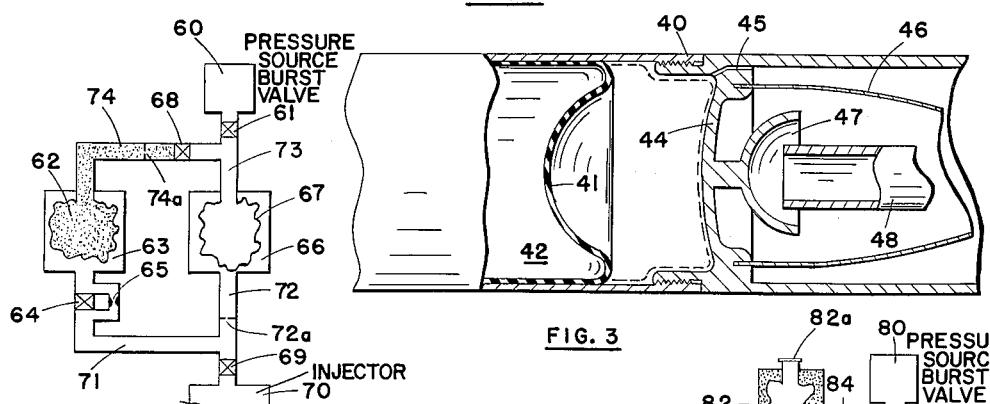
Fig. 3 shows a modification of an ullage compensating device suitable for use in rocket construction.
Fig. 5 shows a schematic means for effecting the rapid pressurization of a liquid in a container.
Fig. 6 shows a modification of a means to effect the rapid pressurization of a liquid in a container.

Fig. 3 shows a modified type of ullage compartment. This compartment 40 comprises an end wall portion 44 and a clamping end piece (not shown) forming a shell portion about the collapsible ullage bag 41. An orifice 45 connects the space between the end 44 of the containing shell and the exterior of the ullage bag with the propellent tank. The illustrated tank contains a flexible portion 46 separating the fuel and oxidizer. The interior of the ullage bag 42 is filled with a gas, such as Freon, preferably having a vapor pressure higher than that of any typical propellants at any temperature in the operating range. During storage and pre-firing of the rocket, expansion and contraction of the propellants is compensated for by the expansion and contraction of the ullage bag 41 by reason of the gradual flow of the propellants through the orifice 45. Upon pressurization of the propellent tanks through exhaust tube 48 and deflector 47, any propellant which has expanded into the space between the exterior of the ullage bag and the shell member surrounding the ullage bag will be trapped in such space due to the restriction of the orifice 45. This orifice is small enough to effectively reduce the propellent flow to a negligible amount during the rapid pressurization.

Figure 4:
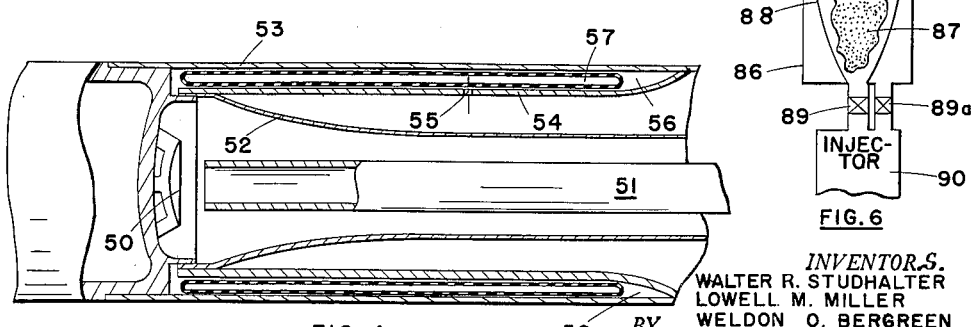
Fig. 4 shows a still further modification of an ullage compensating device.

Fig. 4 shows a modification of the design of the ullage bag illustrated in Fig. 3. In this form the ullage unit or container is concentric with the propellent tanks. The propellent tank as illustrated comprises an inner flexible tank wall 52 and a rigid tank wall 54 having an orifice 55 therein. Concentric with this rigid wall is an outer wall 53 which forms the exterior of the rocket surface. The annular space between walls 53 and 54 forms the ullage compartment in which an ullage bag 57 is placed. This ullage bag 57 is of the annular type and is situated in the ullage space 56. In operation, the exhaust gases travel along the exhaust tube 51, strike the deflector 50 and force the flexible tank wall 52 against the rigid shell 54 expelling both the propellant in the interior propellent tank section and the propellant in the tank section between the wall 52 and the wall 54. During storage and pre-firing, the orifice 55 allows for expansion of the propellants into the ullage space 56. The ullage is thus isolated within the ullage space 56 and the gases traveling in the tube 51 may rapidly pressurize the propellent tank sections.

Fig. 5 illustrates a still further means for effecting the rapid pressurization of a propellant in a propellent tank. This particular means includes provision for forcing the expanded volume of propellant back into the main propellent feed system in order to add it to the main flow into the power plant. This is accomplished by the use of a check valve in conjunction with a bleed valve. The invention of Fig. 5 includes pressurizer 60 which may be similar to the igniter 14 of Fig. 1 or may be a self-contained pressurizing medium such as helium. Lines 73 and 74 connect the pressurizing medium 60 to the propellent tanks and ullage device, respectively, while lines 71 and 72 direct the flow of propellants from the ullage device 63 and the propellent tank 66, respectively. Burstible diaphragms or other quick opening valves 61, 68 and 69 are placed within the aforementioned feed lines. A combined check valve 64 and bleed bypass 65 is connected in the line 71 between the propellent tank and ullage unit. A small ullage bag 62 is provided within the ullage compartment 63 and the interior of this bag as well as the line 74 is filled with a gas, such as Freon, of high vapor pressure. An expandible bag 67 may be placed within the propellent tank 66. Orifices 72a and 74a are placed in lines 72 and 74, respectively, to act as delay means since the overall volume in the ullage device 63 is only about 20 percent of that in the propellent tank 66. The ullage unit will compensate for expansion and contraction of the propellants in the tank 66 due to temperature differences by a flow of the propellants or propellant through the bleed bypass 65 and orifice 72a into the ullage unit 63, thereby compressing the ullage bag 62 and the gas within the ullage bag 62 and line 74.

When the pressurization system 80 is put into operation, high pressure gas (or other medium) bursts the diaphragm 61 and enters the tank and acts immediately on the propellant since there is no ullage problem to contend with. The high pressure gas simultaneously forces valve 68 open, bleeds through orifice 74a, and pressurizes the propellant which happens to be in the ullage unit 63. The propellant in the ullage unit 63 is forced through the check valve 64 into the propellant feed lines 71 and 72 to join the main flow in a time relationship depending upon individual design. This propellent flow bursts the diaphragm 69 and enters into the injector unit 70.

Fig. 6 shows a still further modification of the basic invention. In Fig. 6 both the main pressurization force and the ullage compensating force are transferred to and from the propellent container by utilization of a confined inert fluid. This particular modification permits delivery to the lower plant of all amounts of propellant contained in the propellent tanks. The overall system illustrated in Fig. 6 includes a pressurizing system 80 which, as in Fig. 5, may be an igniter or a self-contained pressurizing tank, an ullage unit 83, propellent tank 86, and an injector and power plant 90. Lines 85 connect the pressurizing means 80 to the ullage compartment and to the propellent tank. A restricted orifices 84 is present in line 85 leading from the pressurizing system to the ullage compartment 83. The ullage compartment 83 contains flexible ullage bag 82 which may be loaded through port 82a. Extending into the propellent tank 86 is an expandible bag 87 containing an inert fluid. Inert fluid is also present in the free space in lines 85 and the space between the flexible ullage bag 82 and the shell 83 containing the ullage bag. The gradual changes in propellent volume, resulting from changes in ambient temperature, are transferred by gradual flow through the restriction orifice 84 of the inert fluid which pressurizes or depressurizes the Freon filled container. Sufficient pressure is always kept on the propellant by this means to prevent vaporization from taking place. Thus, the inert fluid acts as a medium through which expansion and contraction of the propellants are compensated for by the ullage system. In this modification, the propellants, fuel or oxidizer, do not come in contact with the pressurizing medium or with the ullage bag.

When the pressurizing system 80 is put into operation, high pressure gas or other medium opens the normally closed valve or burst diaphragm 81 and pressurizes the inert fluid. This pressure is thereby directly transferred to the propellant. The delivery pressure rises to maximum very rapidly, the burst valves 89 and 89a are opened and full flow to the power plant takes place. The restriction orifice 84 reduces flow of the inert fluid during this phase to a negligible amount for the typical duration. It is to be understood that the propellent tank 86 may contain flexible walls 88 in order to separate the fuel and oxidizer. Pressurization then of the expandible bag 87 pressurizes and expels the fuel and oxidizer on either side of the flexible wall 88. It can be seen that the expandible ullage bag can be submerged in the inert fluid within the propellent tank structure as well as exteriorly of the tank.

There are various methods which can be used to remove trapped air and vapors from the propellent container and the entire system. One such method includes measuring quantities of each propellant in their respective propellent sections, placing a measured quantity of inert fluid in its respective space, opening vapor vents at the high point of each fluid volume, and loading a measured quantity of Freon (calibrated for the particular ambient conditions at the site at time of loading) into the flexible container of the ullage unit, and if necessary, applying additional fluid pressure to the Freon container or to the inert fluid container to cause the propellants to rise in their containers driving out any trapped vapors and to completely occupy the propellent tank sections.

Each of the above means for effecting the rapid pressurization of propellent tanks acts to isolate the inherent ullage present in the propellent tanks. Without these ullage compensation devices, a cold generator, which is operating at a lower pressure to begin with, must pressurize the large ullage space to full tank operating pressure before normal operation of the rocket can begin. The result is a rocket which takes longer to start and hence takes longer to reach a specified target, when cold than when hot. The instant invention, of providing ullage compensating means, enables the pressurizing means to act directly on the propellants without first pressurizing the ullage space.

The above-explained ullage compensating system has been described in terms of its operation in a liquid propellant rocket engine. The use of such ullage compensating system is not limited to such liquid propellant rocket engine but is generally applicable where there is a demand for a rapid rise in pressure to a predetermined level to force a steady supply of liquid from a supply container. Thus, the entire system may be used to rapidly pressurize the fuel in a tank of a turbo-jet, a ram-jet, a reso-jet, or any reaction motor system. Furthermore, the entire system may be used to satisfactorily pressurize the liquids of a liquid-reactant gas generator system or power unit. The use of the herein-described means for rapid pressurization permits the containment, pressurization and rapid delivery of many toxic, flammable, and corrosive liquids or semiliquids.

It has been stated in the various examples described above that the ullage bag must be of the flexible type. The bag may be made of any material that is flexible and compatible with the medium in which it will be in contact. Thus, if an acid oxidizer is to fill the space between the shell containing the ullage bag and the exterior ullage bag, such ullage bag must be of an acid-resistant material. When oxidizers are in contact with the bag, it has been found that such materials as tetrafluoroethylene (Teflon) or polytrifluorochloroethylene (Kel-F) will prevent acid attack. When a fuel such as turpentine is to come in contact with the ullage bag, such ullage bag may be made of Buna-N materials. Fabrication of the bag can be accomplished by either dipping or molding in the case of the rubber bag, while the bags made from the fluorinated polymers may be fabricated from sheet material. These bags may be in the form of single cell bags or multiple cell bags. The basic purpose of the bag is to contain the free space or gas ullage volume, thereby locating the ullage bag at a definite position in or without the propellent tanks and separating it from the liquid propellants. The bags must be flexible in order to undergo the same volume change with temperature as the ullage space. Furthermore, the bag must withstand the chemical attack of the liquid propellant which contacts it.

It can be seen that the incorporation of a relatively simple ullage compensating system to a tank pressurization system enables the tank to be rapidly pressurized. In rocket applications, the performance variations can be reduced to a low level by incorporating such ullage regulator.

Although the invention has been described and illustrated in detail, it is to be clearly understood that the same is by way of illustration and example only and is

We claim:

1. In combination, a liquid propellent rocket having a normally sealed, propellent tank, a combustion chamber and injector means to inject propellant from said tank to said chamber; and means for effecting the rapid pressurization of propellant within said tank comprising a sealed, expansible flexible wall ullage container contiguous to said tank, the exterior of said expansible container being in communication with the interior of said tank, a confined compressible gas medium having a vapor pressure greater than the pressure of the propellant in said tank within said container, means including constant bleed flow restricting means between the interior of said tank and the exterior of said ullage container allowing for expansion and contraction of the propellant within the tank with simultaneous compensating contraction and expansion of said ullage container before actuation of said rocket, and pressurizing means adapted to act directly on the propellant to expel the propellant from the tank through said injector means to said combustion chamber.

2. In combination, a liquid propellent rocket having a normally sealed, liquid propellent tank, a combustion chamber and injector means to inject propellant from said tank to said chamber, and a propellent pressurization system, said system comprising a sealed, expansible, flexible wall ullage container contiguous to and in communication with the interior of said tank and confined by and normally spaced from a rigid shell member, a compressible gas medium confined within said container and having a vapor pressure greater than the pressure of propellant in said tank, constant bleed restrictive passage means between the interior of said tank and the space between said container and said shell member, whereby any change in volume of the liquid propellant within the tank is compensated by an equal but reverse change in the volume of the space between said container and said shell member before actuation of said rocket, and pressurizing means adapted to act directly on the propellant to expel the propellant from the tank through said injector means into said combustion chamber.

3. The system of claim 2 wherein an inert fluid is provided between said tank and said container, expansion and contraction of the liquid propellant being communicated to the ullage container through said inert fluid.

4. The system of claim 2 in which the liquid propellant tank comprises a flexible shell within a rigid shell extending rearwardly from said shell member, a first propellant space between said shells, the interior of the flexible shell forming a second propellant space and communicating with the restrictive passage means at its forward end and contiguous to said injector means at its rearward end.

5. The system of claim 4 in which the shell member encompassing the ullage container is coaxial with the rigid shell of the propellant tank and is of the same outside diameter as said rigid shell.

6. The system of claim 2 in which means is provided to insure that any volume of liquid propellant within the space between the ullage container and the shell member is trapped when the propellant tank is pressurized by said pressurizing means.

7. The system of claim 2 in which a normally open valve is in said restrictive passage means and is adapted to close when the propellent tank is pressurized by said pressurizing means.

References Cited in the file of this patent

UNITED STATES PATENTS

| | | |
|---|---|---|
| 2,546,055 | Ballard | Mar. 20, 1951 |
| 2,611,393 | Gravenhorst | Sept. 23, 1952 |
| 2,634,577 | Halford et al. | Apr. 14, 1953 |
| 2,638,932 | Alexander | May 19, 1953 |
| 2,648,196 | Mullen et al. | Aug. 11, 1953 |
| 2,663,320 | Snyder | Dec. 22, 1953 |